(12) United States Patent
Junker et al.

(10) Patent No.: US 12,145,190 B2
(45) Date of Patent: Nov. 19, 2024

(54) HANDLING SYSTEM

(71) Applicant: OSTERWALDER AG, Lyss (CH)

(72) Inventors: Adrian Junker, Täuffelen (CH); Pascal Lutz, Fraubrunnen (CH)

(73) Assignee: OSTERWALDER AG, Lyss (CH)

( * ) Notice: Subject to any disclaimer, the term of this patent is extended or adjusted under 35 U.S.C. 154(b) by 396 days.

(21) Appl. No.: 17/769,812

(22) PCT Filed: Oct. 26, 2020

(86) PCT No.: PCT/EP2020/080070
§ 371 (c)(1),
(2) Date: Apr. 18, 2022

(87) PCT Pub. No.: WO2021/083842
PCT Pub. Date: May 6, 2021

(65) Prior Publication Data
US 2022/0410244 A1    Dec. 29, 2022

(30) Foreign Application Priority Data

Oct. 31, 2019   (EP) ..................................... 19206568

(51) Int. Cl.
*B21D 43/10*   (2006.01)
*B25J 9/16*    (2006.01)

(52) U.S. Cl.
CPC ............ *B21D 43/10* (2013.01); *B25J 9/1687* (2013.01)

(58) Field of Classification Search
CPC ... B25J 9/02; B25J 9/023; B25J 9/1687; B25J 5/04; B21D 43/10; B21D 43/13
See application file for complete search history.

(56) References Cited

U.S. PATENT DOCUMENTS 10,926,406 B2    2/2021    Prussmeier et al.

FOREIGN PATENT DOCUMENTS

| CN | 104209770 A | 12/2014 | |
|---|---|---|---|
| DE | 10002981 A1 * | 7/2001 | .............. B22F 3/003 |
| DE | 102015116808 B3 * | 1/2017 | .............. B25J 5/005 |
| EP | 3305476 A1 * | 4/2018 | .............. B25J 9/023 |

OTHER PUBLICATIONS

Translation of EP-3305476 (Year: 2018).*
Translation of DE-102015116808 (Year: 2017).*
Translation of DE-10002981 (Year: 2001).*
International Search Report issued in PCT/EP2020/080070 dated Jan. 22, 2021, 4 pages.

* cited by examiner

*Primary Examiner* — Bobby Yeonjin Kim
(74) *Attorney, Agent, or Firm* — Tucker Ellis LLP

(57) ABSTRACT

A handling system (1) for removing molded parts from a press device, the system comprising: a control unit; a linear axis system (10) having at least one linear guide (12) and a first guide slide (14) and a second guide slide (16), which are movable independently of each other along a direction of the at least one linear guide (12), and a guide carriage (24) held displaceably on the first guide slide (14) and the second guide slide (16), which guide carriage is movable in a direction forming an angle α with the direction of the at least one linear guide (12).

14 Claims, 4 Drawing Sheets

HANDLING SYSTEM

The invention relates to a handling system for a molded part, in particular of a pressable material, in order to remove this part from a press device and transfer it to a depositing location and deposit it there. The depositing location can in particular be a workpiece carrier.

STATE OF THE ART

Handling systems or positioning devices are known for removing and transferring molded parts from press devices, in particular powder presses, which remove the molded parts, or green compacts, pressed in the powder press using a material which is essentially in powder and/or granular form, and feed them for further processing. In particular, the green compacts are fed to a subsequent sintering process in which they are sintered under high temperature to form a homogeneous dense molded part. After the pressing process, the green compacts, also known as pressings or blanks, generally lie on a lower tool or lower punch arrangement of the press device and are picked up from there by a gripper or a suitable element of the handling system and then transported to a depositing location and set down. The green compacts generally have more or less complex and filigree shapes and are characterized by minimal solidity or firmness in this phase. Accordingly, handling operations such as gripping or picking up, transporting and setting down the green compacts must be carried out as precisely and with as little vibration as possible, although a certain dynamic response is also required.

Systems with SCARA robots or multi-axis arm robots or also with serially arranged linear axes are known for automatic handling of green compacts. The handling is carried out by means of several movement devices, which are designed as linear axes and/or articulated arm axes and/or as rotary axes, in order to be able to carry out translatory and/or rotatory movement sequences with as many degrees of freedom as possible. If individual linear and/or articulated axes complement each other to form a serial kinematic system, whereby one axis is supported by one or more others, the masses to be moved add up. Accordingly, the mass inertia increases as well as precision deviations and/or vibrations.

Known from DE 100 02 981 is a handling system for a green compact produced in a press and made of a sintered material or a pressable ceramic material with a horizontal Y-linear axis, on which a horizontally arranged X-linear axis is movably arranged, on which in turn an arm with a gripper that can also be moved in the vertical direction is arranged. As with other systems with serially arranged linear axes, where a first linear axis is arranged on a second linear axis and this on a third linear axis and several independent linear drives are provided, unfavorable mass ratios result, which have the effect of a certain acceleration inertia when moving even just one of the linear axes. Accordingly, the masses to be accelerated and decelerated in conventional handling systems are often in complete contrast to the mass of the molded parts to be transported. In addition, the required installation space of such a handling system is large, which is disadvantageous in some spatially confined peripheries of powder presses. Furthermore, good accessibility and a large accessible depositing surface for the precise loading of carriers, for example, are requirements of a handling system.

It is the object of the present invention to develop a handling system for molded parts which makes possible a precise and highly dynamic handling, i.e. picking up, transporting and setting down, of sensitive objects of different shapes, while avoiding damage to them. Furthermore, the handling system should be provided with a gripping and/or processing unit in the area of press devices, e.g. powder presses, with a modular structure for maximum flexibility and furthermore good accessibility and a large traversable area.

These objects are achieved through a handling system according to claim 1. Advantageous details of this handling system can be found in the dependent claims and in the description.

SUMMARY OF INVENTION

In the following, according to the Cartesian coordinate system, the X-direction is to be understood as a horizontal direction over which molded parts are transported linearly from a pick-up location to a set-down location. Perpendicular to this, the Y-direction extends horizontally. The Y direction spans a horizontal X-Y plane with the X direction. The Z direction is designated as the vertical direction that extends perpendicular to the horizontal X-Y plane. In general, designated by linear unit is a driven linear axis with linear guide and a guide slide that can be moved in translation along the linear guide; or respectively by rotary axis, for example C- or respectively D-axis, a rotary element is designated.

The handling system according to the invention will be described in the following in relation to a handling of molded parts, or respectively green compacts and in connection with a press device, but can also be used for picking up, transporting and setting down of other molded parts or respectively elements and is thus usable not only in combination with press devices.

The handling system according to the invention is based on the principle that any two-axis movements in horizontal and/or vertical direction are possible by means of two independent drives and in operating connection with movement transmission means.

A handling system for removing molded parts from a press device is disclosed, comprising a control unit and a linear axis system with at least one linear guide and a first guide slide and a second guide slide, which are movable independently of each other in a direction of the at least one linear guide, and a guide carriage held displaceably on the first guide slide and the second guide slide, which guide carriage is movable in a direction forming an angle α with the direction of the at least one linear guide.

In an embodiment of the handling system, the first guide slide is displaceably connected to the guide carriage by means of first guide means and the second guide slide is displaceably connected to the guide carriage by means of second guide means. The guide means thereby comprise a linear guidance and a rail linearly displaceable therein. The first guide means and the second guide means are arranged in different orientation relative to the direction of the at least one linear guide.

The control unit of the handling system according to the invention is set up to control the movements of the handling system in a coordinated manner and can also be provided by a control of an associated press device.

In a preferred embodiment of the handling system the linear axis system comprises a first linear axis with the first guide slide and a second linear axis with the second guide slide, which axes are arranged parallel to one another. For example, as X-linear axes, e.g. designed as X-linear axes with X-linear guides, each with an X-guide slide, whereby the respective guide slides can be moved independently of one another in the direction of the linear guides, in a way controlled by the control unit. In the described embodiment, the guide carriage, which is movably held on the guide slides of the parallel linear axes, is disposed in an X-Z plane and is movable in this plane.

The guide slides are movable synchronously or relative to each other, whereby in the latter case the guide slides are moved offset to each other in the direction of the linear guides. With relative movement of the guide slides along the direction of the linear guides, a positioning results of the guide carriage connected to the guide slides, by means of a thereby generated superimposed movement, both in the direction of the linear guides and in a direction perpendicular to it, for example in X and Z direction. In particular, the arrangement of two parallel independent linear axes in the linear axis system proves to be very dynamic with regard to the movement of the guide carriage moved thereby and the elements that can be picked up on it, among other things owing to a favorable weight distribution.

Different arrangements of two linear axes parallel to one another are conceivable. The parallel linear axes can be arranged adjacent to each other, so that the guide slides are movable along external linear guides. Alternatively, the parallel linear axes can be arranged at a distance from each other so that the guide slides are movable between the opposing inner linear guides.

In the handling system according to the invention, the guide carriage is slidably connected to the guide slide, whereby the guide carriage movable with the guide slides with the linear axes is movable in a plane spanned by the direction of the linear guides, e.g. the X-direction and a direction perpendicular thereto, in particular the Z-direction, and thus in the X-Z plane. The guide carriage can, for example, be frame-like with at least one side member and one cross member, whereby the at least one side member is connected to the guide slides in a suitable manner, for example, by means of guide means that are displaceably thereon.

The guide means are designed in such a way that the guide carriage executes a movement in a direction that extends at an angle to the direction determined by the at least one linear guide. For this purpose, it is provided that the guide means comprises at least one linear guidance, in which a rail is guided in a linearly displaceable manner. The linear guidance can be disposed either on the side member or on the respective guide slide. Accordingly, the rail, slidably guided therein, is then provided either on the guide slide or on the side member of the guide carriage.

For a movement of the guide carriage in a plane which is spanned by the direction of the at least one linear guide and another direction, for example the X-Z plane, it is necessary that the guide means for the movable connection of the guide carriage with the respective guide slides are arranged in a different orientation with respect to one another. Thus, for example, a guide means can be arranged for the displaceable connection of one of the guide slides with the at least one side member in the Z-direction and, in the embodiment, form an angle of 90° with the direction of the X-linear axis. The other guide means for displaceable connection of the other guide slide to the side member forms an angle of less than 90° with the direction of the X-linear axis, preferably an angle $\alpha$. In a preferred embodiment, the guide means are arranged in such a way that they form an angle of the same magnitude but different sign with the direction of the at least one linear guide.

In an embodiment with a frame-like guide carriage, with two side members, for better stability for the displaceable connection of one of the guide slides and one of the side members of the guide carriage, two guide means are provided which are oriented parallel to each other at an angle to the direction of the linear guide.

In an embodiment of the handling system the control unit is arranged to move the guide slides synchronously or relative to each other along the direction of the at least one linear guide into a predeterminable position.

If the two guide slides are moved synchronously along the at least one linear guide, e.g. along the at least one X-linear axis, only a translatory movement of the guide carriage arranged thereon takes place in the X-direction. This can correspond, for example, to the linear transport path from a removal point or a pick-up point of the molded part to a deposit point, whereby the deposit point is a weighing facility or, for subsequent processes, a workpiece carrier in which the molded parts are palletized. Palletizing generally requires several pick-up and set-down operations, whereby the repeated gripping and setting down of the molded parts, which are fragile at this stage of the process, is associated with a high risk of damage and must therefore be carried out precisely. This is achieved by the lightweight construction of the handling system according to the invention and precise control of the movement of a gripping element that can be connected to it.

With a relative movement of the guide slides along the at least one linear guide, for example when the guide slides are moved not synchronously but offset to one another in direction of the X-linear axes, the guide carriage, which is slidably connected to the guide slides, is moved in the vertical direction for a vertical lift. Through the relative movement of the guide slides along the direction of the linear guide, the guide carriage displaces itself relative to the linear guide along a direction along a direction which is adjustable by the orientation of the guide means of the connection between guide slide and guide carriage, so that the guide carriage is adjustable and positionable, for example in the Z-direction, i.e. performs a vertical lift. The angle $\alpha$, which can be adjusted between the direction of the linear guide and the orientation of the guide means by means of the selected construction, is thereby decisive for the vertical lift.

The guide carriage can be combined in a modular way with further linear axes, rotary axes and/or functional means according to the handling operations to be carried out by the handling system. In a preferred embodiment, a C-axis can be accommodated on the guide carriage, which axis extends in the Z-direction and is set up to rotatably hold functional elements to be described in more detail. Thus, a functional element can be pivoted or rotated about the Z-direction.

In one embodiment, the handling system according to the invention is set up to interchangeably accommodate functional elements, for example on the C-axis, whereby the functional elements themselves can be of different types and can also include other linear axes or rotary axes. Accordingly, a further D-axis can be provided so that at least one of the receivable functional elements can be rotated by means of this, so that, for example, the orientation of a gripped molded part can be changed.

In one embodiment, the at least one exchangeable functional element can be designed as gripping element, to pick up a molded part, for example from a punch assembly of a powder press. Suitable gripping elements can be designed as vacuum, suction, hole or pincer grippers with additional functions for rotating, turning or tilting. In addition, further functional elements can be provided which are able to be brought into working position by rotation of the C-axis. For example, such a functional element can be designed as cleaning element, which is set up to clean a mold for the production of the molded part in the punch arrangement of the powder press after removal of the green compact or molded part.

Preferably the handling system is set up to take a molded part out of a press device at a pickup location, to transport it from the pickup location to a deposit location and to set it down in a positioned way at the deposit location. The deposit location can thereby be a weighing facility. Alternatively, the deposit location can be a workpiece carrier. Accordingly, the handling system enables gripping, lifting, turning, positioning and depositing of molded parts with high repetition, positioning and sequence accuracy, whereby a large variety of parts can be moved with high cycle times.

According to one embodiment of the handling system, the positioning of the functional means or of the at least one functional element movably mounted thereon in the direction of a Y-axis is carried out from a movement superposition in the X-direction and rotation about the C-axis and/or D-axis. Preferably the C-axis is set up to pick up at a pickup location molded parts positioned in any way or generally parts and to set them down in a suitable position and arrangement at a deposit location. Furthermore the D-axis can be set up to compensate substantially for a change in orientation of the molded part caused by the C-axis or respectively to be able to set down the molded part in a determinable orientation and thus precisely in position, for example on a carrier pallet.

Preferably detection means, or respectively a detection system, can be provided for determining positions, which detect the position of the functional means in the X-direction and in the Z-direction, for example by means of capturing the position in X-direction of the parallel linear axes and processing the signal taking into account the angle α. This represents an advantage over indirect determination of the position of the guide slide, which is generally less precise.

According to one embodiment, the handling system can comprise means for weight compensation. In a preferred embodiment of the handling systems according to the invention, pneumatic or hydraulic devices are provided on the guide slides for weight compensation of the elements disposed thereon. Corresponding means can thereby be arranged with differing orientation, for example parallel to the guide means and/or parallel to linear axes. In addition to the weight of the guide slides and a load weight acting thereon, the masses of the guide carriage with functional means are also compensated and/or the C-axis and/or the D-axis. Accordingly, these masses are not held by the drives of the linear axes, especially the X-linear axes. This prevents them from having to apply a continuous torque in addition to a dynamic drive torque, which would drastically increase their drive power in an unfavorable case.

With the design of the handling system according to the invention for molded parts, comprising a control unit and a linear axis system, comprising at least one linear guide and two guide slides, which are movable independently of one another and also relative to one another along a direction of the at least one linear guide, movements of associated elements tend to be executed more dynamically. The design of the handling system requires little installation space and can be easily combined with other equipment owing to its maximum flexibility. In particular the use in connection with a press device for removal of a molded part from a punch arrangement proves advantageous due to the compact design of the handling system according to the invention and offers moreover good accessibility and reachability of a large traversable area.

With the handling system according to the invention, coordinated translatory and/or rotatory movements in the spatial directions of the included functional elements can be carried out under the control of the control unit. The absence of a conventionally provided Z-linear axis offers advantages not only in terms of inertia, but also through a simplified periphery of the handling system in terms of cables and space requirements. In particular, guiding errors of a Z-linear axis can be avoided, which in addition to deviations in the X-direction and/or Y-direction can lead to an offset of the functional element to be positioned.

Different drive units can be used to drive the linear axes and/or rotary axes. For example, belt axes for high travel speeds and long travel distances, spindle axes for increased accuracy and linear motor axes for special requirements in terms of dynamics, accuracy and synchronization are known. The use of linear motors allows the highest accelerations, whereby cycle times are reduced with multiple handling.

The guide slides can be movably held by rollers, ball rail guides or sliding guides on a corresponding guide profile designed on the linear axes.

BRIEF DESCRIPTION OF THE DRAWINGS

Further advantages and details of the present invention are found in the following description of different embodiments with reference to the figures.

DETAILED DESCRIPTION OF THE EMBODIMENTS OF THE INVENTION

Figure 1:
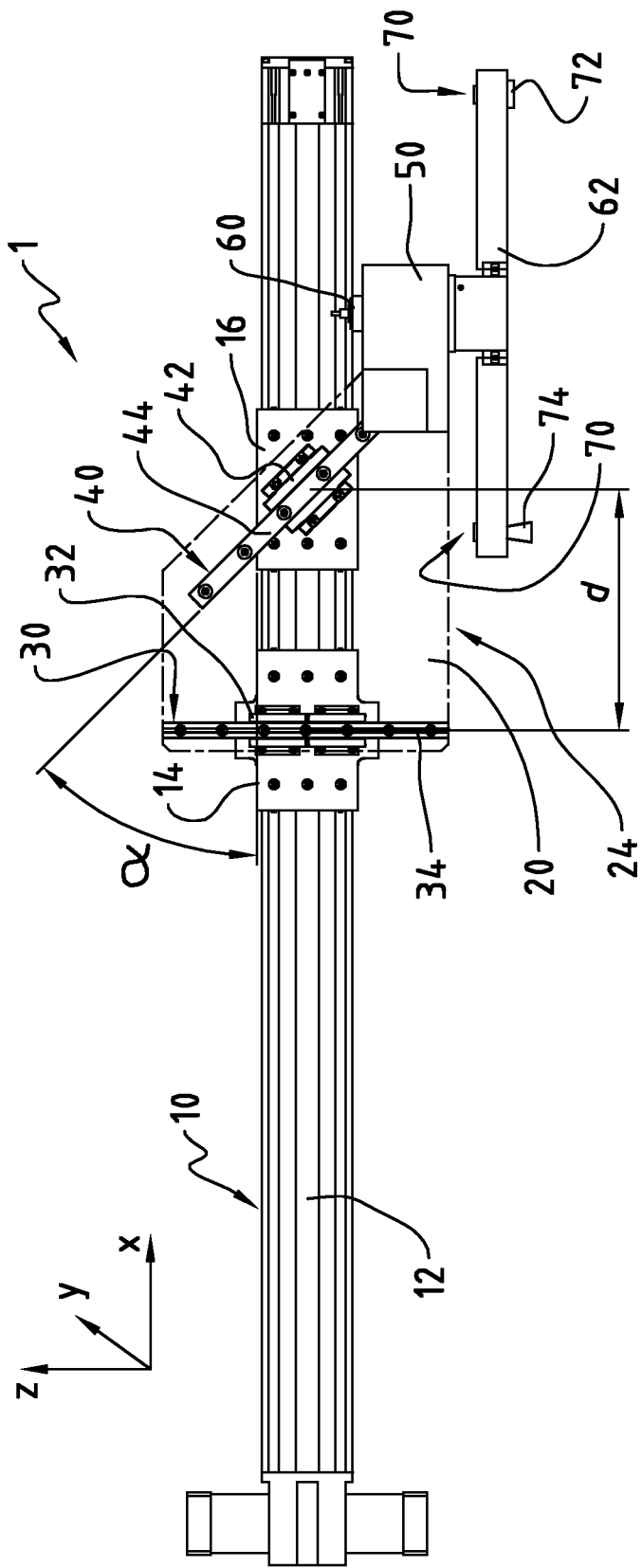
FIG. 1 shows a schematic perspective view of a handling system according to the invention in a first embodiment.

The handling system 1 shown in FIG. 1 is associated with a device, preferably a press device or respectively a powder press for producing a molded part from a powdery and/or granular pressable material with an upper and lower punch arrangement. The handling system 1 comprises a control unit (not shown), which can also be that of the powder press. By means of der control unit a linear axis system is able to be controlled, which, in the first embodiment of FIG. 1, comprises a linear axis 10, which is designed as X-linear axis 10, and a linear guide 12 extending in X-direction, on which a first guide slide 14 and a second guide slide 16 are disposed. The first guide slide 14 and the second guide slide 16, controlled independently of one another by the control unit, can be driven along the linear guide 12. Accordingly, the first guide slide 14 and the second guide slide 16 can be moved synchronously, i.e. at the same speed and at the same distance d from each other. The handling system 1 is however also set up in such a way that the first guide slide 14 and the second guide slide 16 move relative to one another or respectively are drivable into a respective end position, in which the distance d in X-direction is adjustable in a certain region between first and second guide slide 14, 16.

On the first guide slide 14 and the second guide slide 16, a side member 20 is slidably held by means of first guide means 30 and second guide means 40. In the embodiment shown in FIG. 1, the first guide means 30 comprising a linear guidance 32 held on the first guide slide 14 and a rail 34 slidably received therein and held on the side member 20 is arranged in a Z-direction, the rail 34 being linearly movable in said direction. The second guide means 40 comprises a linear guide 42 held on the second guide slide 16 and a rail 44 guided therein, which is oriented at an angle α to the X-direction and supported on the side member 20.

The side member 20 is an element of a guide carriage 24 and is designed in such a way that an accommodation 50 for a C-axis 60 is provided. This C-axis 60 is in operative connection with a connecting element 62. Functional elements 70 can be interchangeably attached to the connecting element 62, which functional elements are designed, for example, as a gripping element 72 or also as a cleaning element 74 and, by means of the C-axis 60 and the movements of the first guide slide 14 and of the second guide slide 16, can be brought into a desired position. The C-axis 60 as well as the functional elements 70 can be combined in a modular way with the handling system 1 according to needs.

Figure 2:
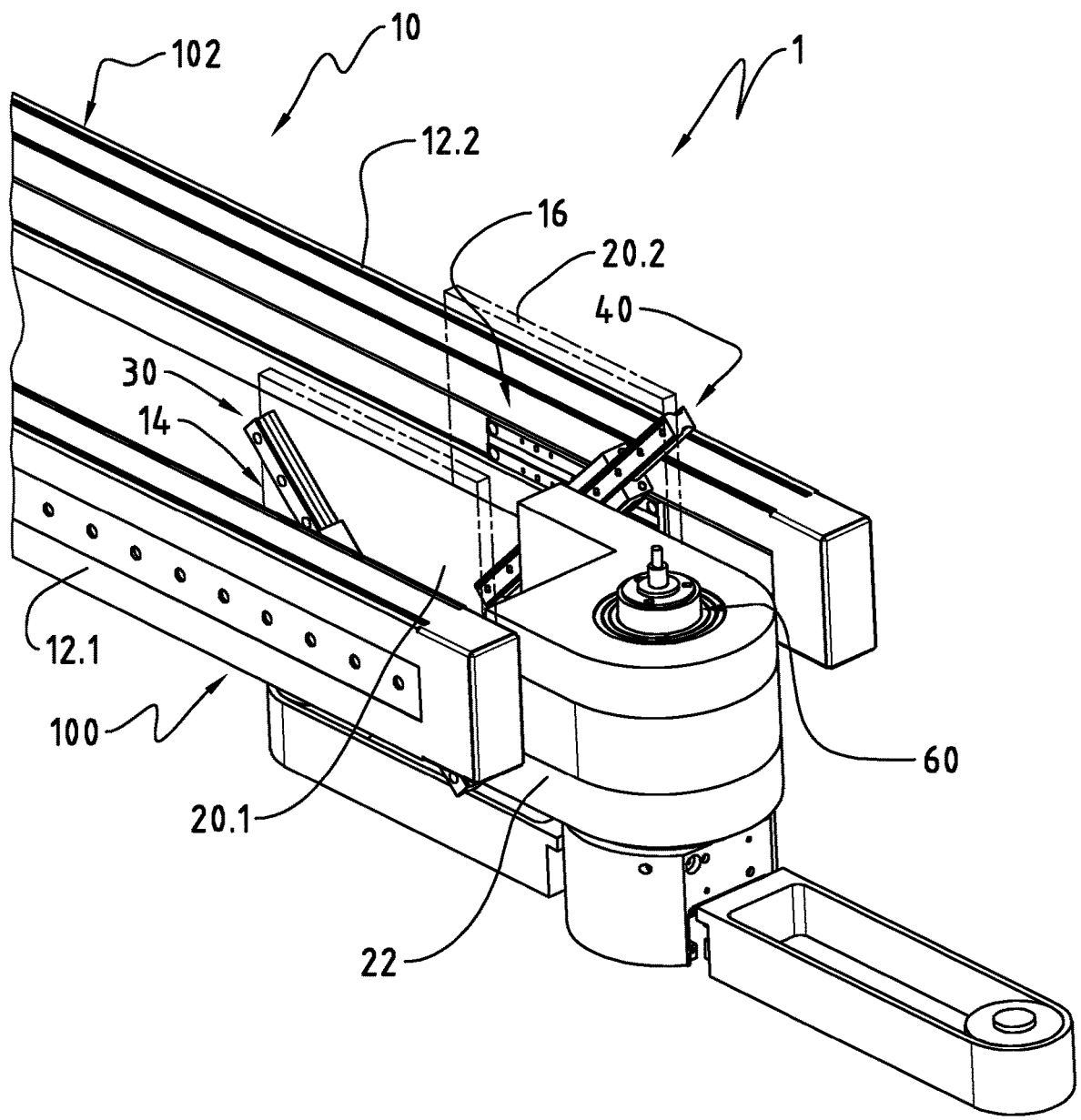
FIG. 2 shows a schematic perspective view of a handling system according to the invention in a second embodiment, <in a> front view of the handling system according to the invention.

Shown in FIG. 2 is a detail of a second embodiment of the handling system 1 in which same or comparable elements as in the first embodiment of FIG. 1 have been designated using the same reference numerals or symbols. In the second embodiment, the linear axis system 10 comprises two linear axes, comprising a first linear guide 12.1 with the first guide slide 14, forming a first X-linear axis 100, and a second linear guide 12.2 with the second guide slide 16, forming a second X-linear axis 102. The two X-linear axes 100 and 102 are disposed parallel to one another at a distance, are arranged parallel to each other at a distance, whereby the respective guide slides 14, 16 are guided internally in the resulting interim space.

Held in a displaceable way on the first guide slide 14 is a first side member 20.1, and on the second guide slide 16 is a second side member 20.2, by means of the first guide means 30 or respectively the second guide means 40. The first side member 20.1 and the second side member 20.2 form with at least one cross member 22 the frame-like guide carriage 24 (not shown), at which further axes, for example the C-axis 60, can be accommodated.

As shown in FIG. 2, the first guide means 30 and the second guide means 40 are positioned in such a way that they each form an angle with the X-direction, which angle has, for example, the amount a but different signs. The respective angles between the first and second guide means 30, 40 can, however, also form different angles with the X-direction.

Figure 3:
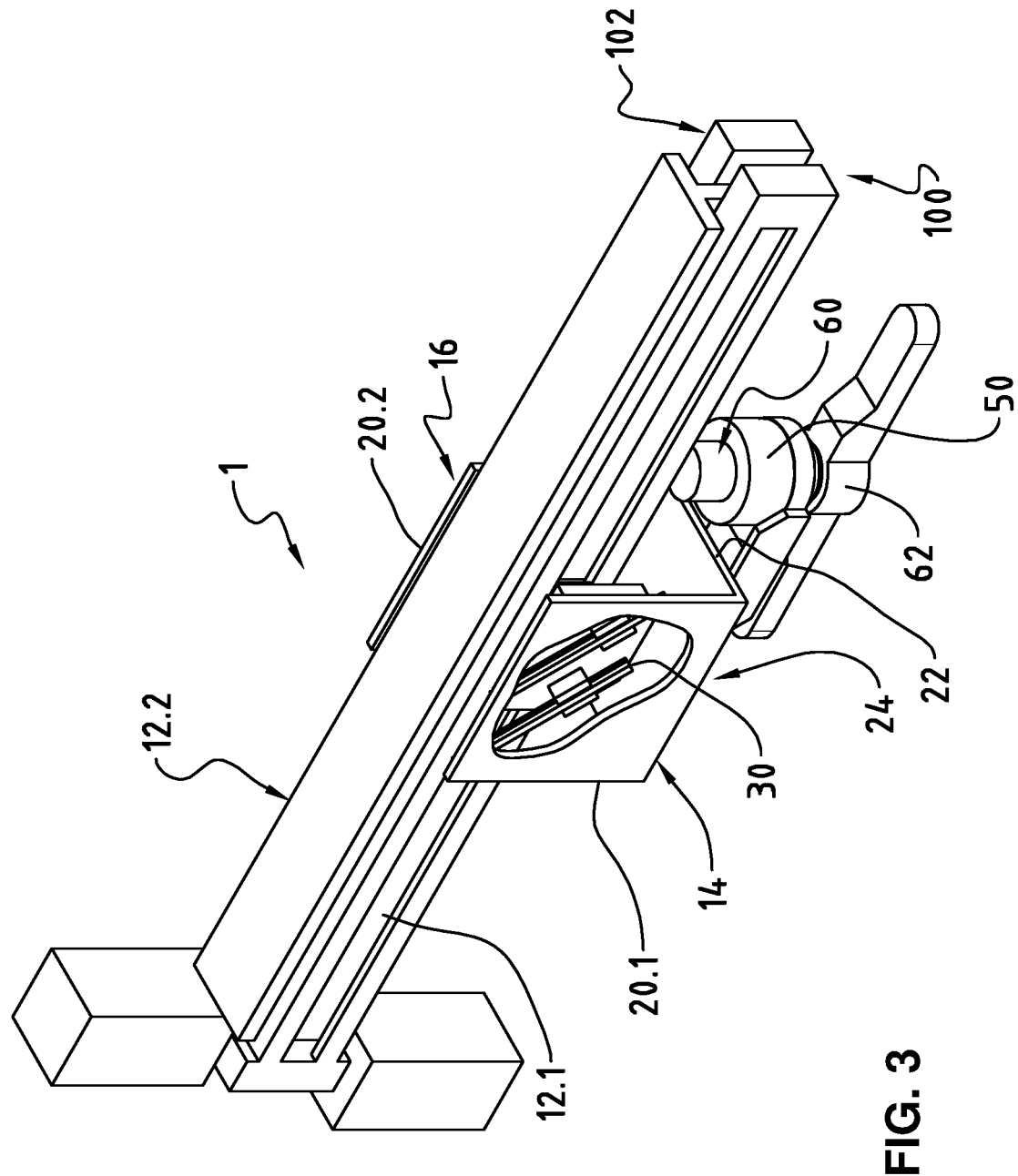
FIG. 3 shows a schematic perspective view of a handling system according to the invention in a third embodiment.

Shown in perspective in a schematic way in FIG. 3 is a third embodiment of the handling system 1, which comprises the two parallel X-linear axes 100, 102. Also shown are the first guide slide 14 and the second guide slide 16, which, in the first linear guide 12.1 or respectively in the second linear guide 12.2, are movable along the X-direction. Accordingly the first guide slide 14 and the second guide slide 16 are held in a displaceable way on linear guides 12.1 or respectively 12.2, and are movable by means of drive units, for example linear motors, which are situated parallel to the linear guides 12.1 and 12.2 or are integrated in them. The guide carriage 24 is movable by means of the X-linear axes 100, 102.

The guide carriage 24 is designed as a kind of frame, comprising the side members 20.1, 20.2, disposed parallel to one another, which are each accommodated in a slidable way on the first guide slide 14 or respectively the second guide slide 16 by means of the guide means 30, 40. The guide carriage 24 is thus movable in the X-Z-plane, which forms the angle α with the X-direction.

The positioning of the X-linear axes 100, 102 can take place, for example, with reference to markings along the linear guides 12.1 or respectively 12.2, which are scanned by scanning heads (not shown), in order to determine the respective current position of the parallel independent X-linear axes 100, 102. Alternatively the positioning of the X-linear axes 100, 102 can take place indirectly via the drive units. Conventional position controllers can be used for all moving axes, i.e. linear axes and rotary axes, in order to control a respective predeterminable target position, so that a functional element connected to it can be positioned.

Further linear axes, rotary axes or functional means are able to be accommodated on the guide carriage 24. Shown is the C-axis 60, accommodated in the accommodation 50, and, by means of the connecting element 62, further functional elements can be interchangeably added, which are rotated around the Z-direction by means of the C-axis 60. Deviations from a predetermined movement of one of the functional elements are corrected, whereby translational and rotational degrees of freedom are determined by means of suitable measuring systems in relation to a suitable reference system.

The functional <sic. guide> carriage 24 moves essentially along the X-direction, but is also movable in the Z-direction by virtue of the handling system according to the invention, without a separate linear axis being provided for this. Relative movement of the two parallel independent X-linear axes 100, 102, or of the first and second guide slides 14, 16 slidably accommodated thereon, produces a movement of the side members 20.1, 20.2 slidably connected thereto by means of the guide means 30, 40 (not shown) and therewith of the guide carriage 24 along a direction which is at an angle α relative to the X-direction. Accordingly, the functional <sic. guide> carriage 24 performs a vertical lift without requiring another Z-linear axis for this purpose.

Figure 4:
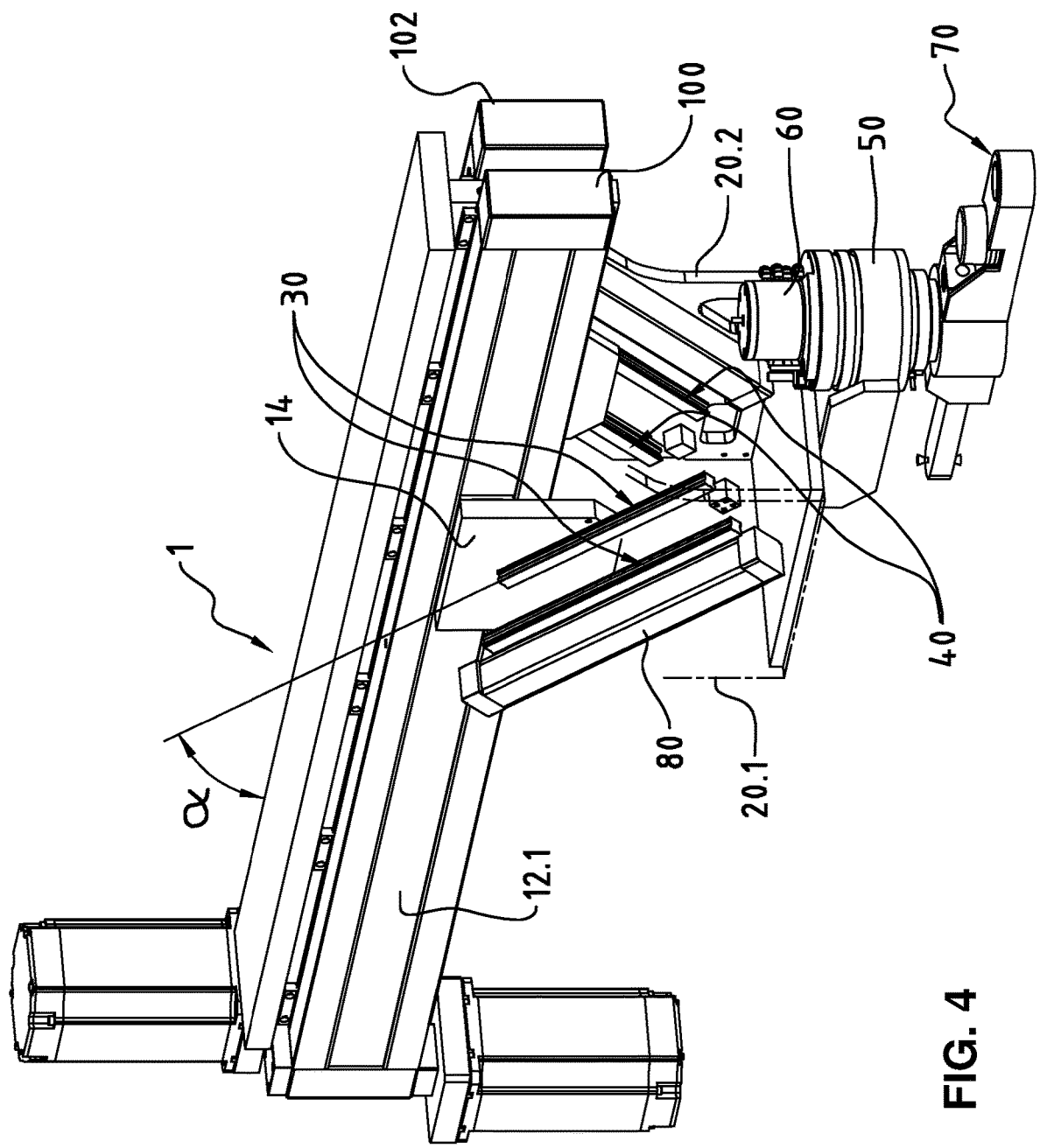
FIG. 4 shows a schematic detail view of a handling system according to the invention according to the third embodiment with partially removed elements.

Shown in FIG. 4 is a perspective view of the third embodiment of the handling systems 1, whereby some parts have been omitted for better presentation. The illustration shown in FIG. 4 corresponds largely to the illustration in FIG. 3, whereby one of the side members 20, i.e. side member 20.1, has been omitted, or is only shown schematically, in order to show the arrangement of the guide means 30, 40. On each of the side members 20.1, 20.2, two guide means 30 and 40 in each case are arranged parallel to each other, which form an angle α of the same magnitude but of opposite sign on each side with respect to the X-direction. The connection of the first and second guide slide 14, 16 with the respective side members 20.1, 20.2 by means of second guide means 30, 40 per side improves the movement behavior, especially the stiffness, and prevents vibrations. Furthermore, a weight compensation 80 is provided on each of the side members 20.1, 20.2 to compensate for the weight acting on the linear axes 100, 102.

The invention claimed is:
1. Handling system for removing molded parts from a press device, comprising:
 a control unit,
 a linear axis system with at least one linear guide and a first guide slide and a second guide slide, which are movable independently of each other in a direction of the at least one linear guide, and a guide carriage held displaceably on the first guide slide and the second guide slide, which guide carriage is movable in a direction forming an angle α with the direction of the at least one linear guide;

said handling system being configured to pick up a molded part from a press at a pick-up location, to transport said molded part from the pick-up location to a depositing location, and to set down said molded part at the depositing location.

2. Handling system according to claim 1, wherein the first guide slide is displaceably connected to the guide carriage by means of first guide means and the second guide slide is displaceably connected to the guide carriage by means of second guide means.

3. Handling system according to claim 2, wherein the first and second guide means each comprise a linear guidance and a rail linearly displaceable therein, and whereby the first guide means and the second guide means are arranged in different orientation relative to the direction of the at least one linear guide.

4. Handling system according to claim 1, wherein the linear axis system comprises a first linear axis with the first guide slide and a second linear axis with the second guide slide, which first linear axis and second linear axis are designed as X-linear axes arranged parallel to one another and whereby the guide carriage, displaceably held on the first guide slide and the second guide slide, is arranged in an X-Z plane.

5. Handling system according to claim 1, wherein the control unit is configured to move the first guide slide and the second guide slide synchronously or relative to each other along the direction of the at least one linear guide into a predeterminable position.

6. Handling system according to claim 5, wherein in the event of a relative movement of the first guide slide and the second guide slide, the guide carriage, displaceably held on the first and second guide slides, executes an adjustable movement in a direction which is perpendicular to the direction of the at least one linear guide.

7. Handling system according to claim 1, wherein the guide carriage is designed to be combined with a linear axis, a rotary axis and/or functional means.

8. Handling system according to claim 1, wherein at least one functional element is exchangeably accommodated on the guide carriage.

9. Handling system according to claim 8, wherein the at least one functional element is a gripping element for a molded part.

10. Handling system according to claim 9, wherein the gripping element is rotatable by means of a D-axis so that an orientation of a molded part gripped thereby can be changed.

11. Handling system for removing molded parts from a press device, comprising:
a control unit,
a linear axis system with at least one linear guide and a first guide slide and a second guide slide, which are movable independently of each other in a direction of the at least one linear guide,
a guide carriage held displaceably on the first guide slide and the second guide slide, which guide carriage is movable in a direction forming an angle α with the direction of the at least one linear guide, and
a cleaning element exchangeably accommodated on the guide carriage.

12. Handling system according to claim 1, wherein the depositing location is a weighing facility.

13. Handling system according to claim 1, wherein the depositing location is a workpiece carrier.

14. Handling system for removing molded parts from a press device, comprising:
a control unit,
a linear axis system with at least one linear guide and a first guide slide and a second guide slide, which are movable independently of each other in a direction of the at least one linear guide, and
a guide carriage held displaceably on the first guide slide and the second guide slide, which guide carriage is movable in a direction forming an angle α with the direction of the at least one linear guide,
wherein weight compensation is provided on the first guide slide and/or the second guide slide.

* * * * *